United States Patent
Netzel, Sr. et al.

(10) Patent No.: US 8,818,530 B2
(45) Date of Patent: Aug. 26, 2014

(54) LED LIGHT CONTROLLER SYSTEM AND METHOD

(75) Inventors: Robert J. Netzel, Sr., Simi Valley, CA (US); Daniel A. Armstrong, Simi Valley, CA (US); Louis F. Teran, Granada Hills, CA (US); Jeffrey S. Barsamian, Thousand Oaks, CA (US); Abhinay Agarwal, Bareilly (IN); Santanu Roy, Faridabad (IN); Dennis C. Dunn, Thousand Oaks, CA (US)

(73) Assignee: Pentair Water Pool and Spa, Inc., Sanford, NC (US)

( * ) Notice: Subject to any disclaimer, the term of this patent is extended or adjusted under 35 U.S.C. 154(b) by 0 days.

(21) Appl. No.: 12/260,912

(22) Filed: Oct. 29, 2008

(65) Prior Publication Data

US 2009/0204239 A1   Aug. 13, 2009

Related U.S. Application Data

(60) Provisional application No. 61/000,804, filed on Oct. 29, 2007.

(51) Int. Cl.
    *G05B 11/01*   (2006.01)
(52) U.S. Cl.
    USPC .............................. 700/17; 700/286; 700/298
(58) Field of Classification Search
    USPC ........................................ 700/17, 33, 83, 286
    See application file for complete search history.

(56) References Cited

U.S. PATENT DOCUMENTS

| | | | |
|---|---|---|---|
| 4,317,071 A * | 2/1982 | Murad | 315/312 |
| 5,642,130 A | 6/1997 | Browne | |
| 6,008,634 A * | 12/1999 | Murofushi et al. | 324/117 H |
| 6,046,550 A * | 4/2000 | Ference et al. | 315/291 |
| 6,125,481 A | 10/2000 | Sicilano | |
| 6,292,901 B1 | 9/2001 | Lys et al. | |
| 6,781,329 B2 | 8/2004 | Mueller et al. | |
| 6,782,309 B2 | 8/2004 | Laflamme et al. | |
| 6,867,558 B2 | 3/2005 | Gaus, Jr. et al. | |
| 6,936,798 B2 | 8/2005 | Moreno | |
| 6,936,978 B2 | 8/2005 | Morgan et al. | |
| 6,967,448 B2 * | 11/2005 | Morgan et al. | 315/295 |
| 6,984,944 B2 | 1/2006 | Garrity | |
| 7,233,831 B2 | 6/2007 | Blackwell | |
| 2003/0028260 A1 * | 2/2003 | Blackwell | 700/18 |
| 2005/0035728 A1 * | 2/2005 | Schanberger et al. | 315/291 |
| 2005/0253533 A1 * | 11/2005 | Lys et al. | 315/224 |
| 2006/0045750 A1 | 3/2006 | Stiles, Jr. | |
| 2006/0198143 A1 * | 9/2006 | Cheung | 362/251 |
| 2007/0159421 A1 * | 7/2007 | Peker et al. | 345/82 |
| 2008/0048588 A1 * | 2/2008 | Mehta | 315/309 |
| 2008/0140231 A1 * | 6/2008 | Blackwell et al. | 700/90 |
| 2008/0252664 A1 * | 10/2008 | Huang et al. | 345/690 |

FOREIGN PATENT DOCUMENTS

WO   WO/2005/115058   12/2005

* cited by examiner

*Primary Examiner* — Mohammad Ali
*Assistant Examiner* — Nathan Laughlin
(74) *Attorney, Agent, or Firm* — Quarles & Brady LLP

(57) ABSTRACT

Embodiments of the disclosure provide a system for selecting a color show generated by LED landscape, pool, and/or spa lights. The system can include a faceplate indicating the color shows available to select from. The faceplate includes a selector positioned to select one of the color shows. The system includes a microcontroller in communication with the selector and a triac circuit in communication with the microcontroller. The microcontroller controls the LED landscape, pool, and/or spa lights using the triac circuit in response to the position of the selector.

10 Claims, 15 Drawing Sheets

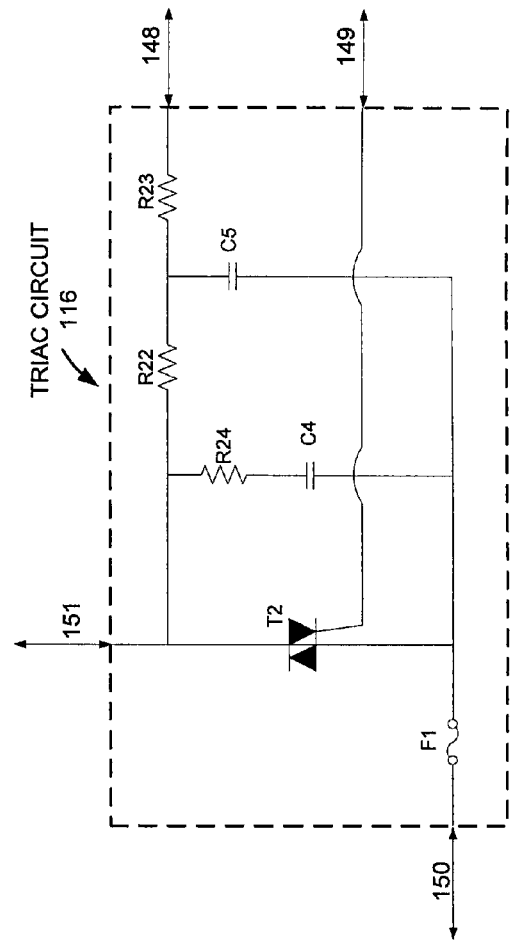
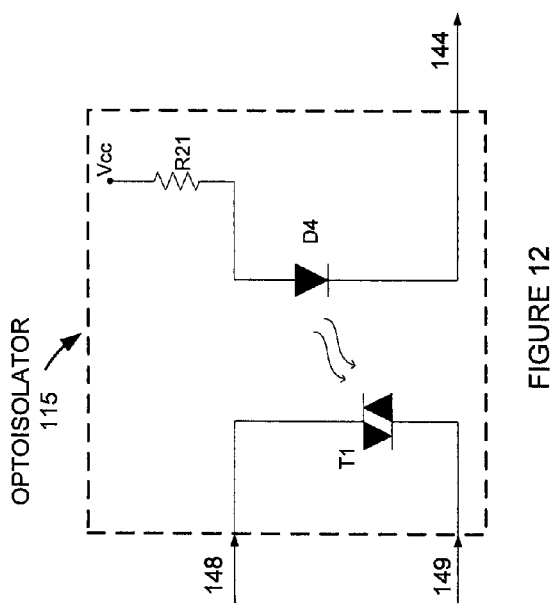
FIGURE 13
FIGURE 12

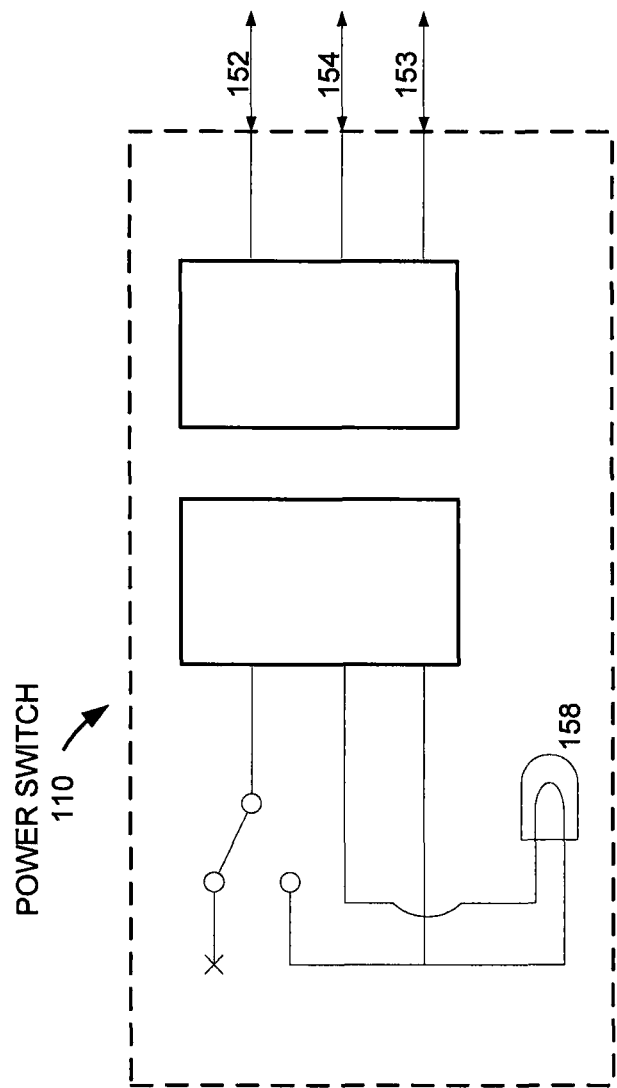

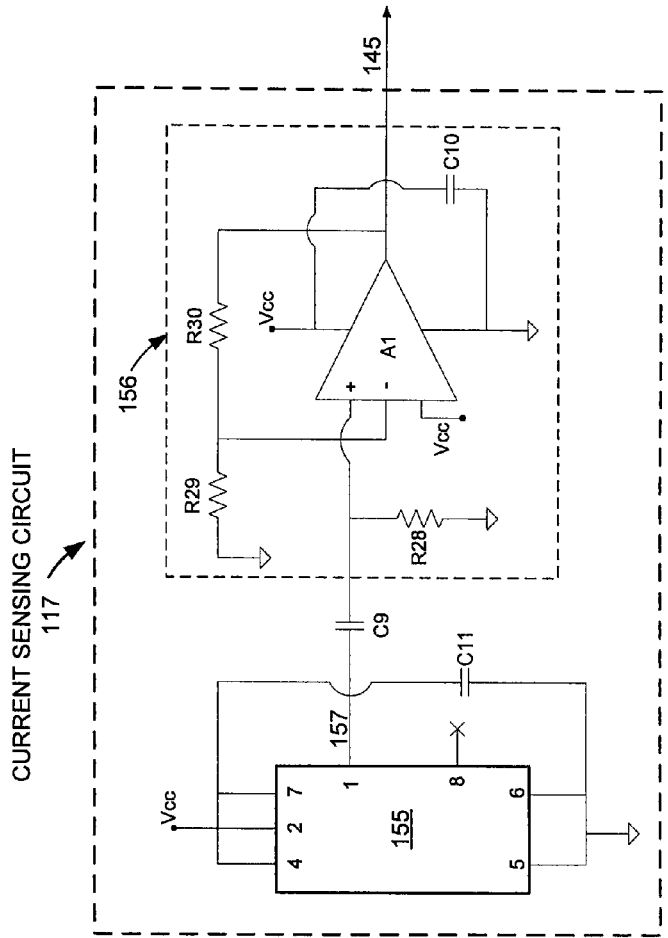
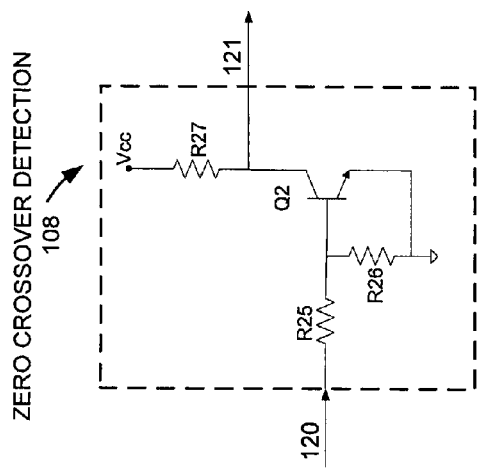
FIGURE 17
FIGURE 16

US 8,818,530 B2

LED LIGHT CONTROLLER SYSTEM AND METHOD

RELATED APPLICATIONS

This application claims priority under 35 U.S.C. §119 to U.S. Provisional Patent Application No. 61/000,804 filed on Oct. 29, 2007, the entire contents of which is incorporated herein by reference.

BACKGROUND

Light emitting diodes (LEDs) are used in various types of landscape, pool, and spa lights and can be connected to a control system to output various color shows. Conventional methods for selecting color output are accomplished by turning alternating current (AC) power from a mains supply line on and off with an AC switch. However, with a multitude of fixed colors and color shows that can be selected, it becomes very tedious for the user to select a show by means of toggling an on/off switch.

Current systems for controlling LED landscape, pool, and spa lights include a microcontroller circuit that outputs pulse-width modulated (PWM) signals to the LEDs. In these systems, LEDs of various colors are necessary and the PWM signals control the intensity of the LEDs to produce various colors and effects.

SUMMARY

Embodiments of the disclosure provide a system for selecting a color show generated by LED landscape, pool, and/or spa lights or sources. The system can include a faceplate indicating the color shows available to select from. The faceplate includes a selector, such as a rotary switch, positioned to select one of the color shows. The system includes a microcontroller in communication with the selector and a triac circuit in communication with the microcontroller. The microcontroller controls the LED landscape, pool, and/or spa lights using the triac circuit in response to the position of the selector.

In some embodiments, the triac provides communication between an AC source and the LED sources. The triac receives signals from the microcontroller based on the data received from a user interface, such as the selector of the faceplate. The triac clips the voltage from the AC source to the LED sources in order to provide one or more voltage pulses to the LED sources based on the signals received from the microcontroller.

In some embodiments, the system includes an output power trace from the AC source to the LED sources. The system can also include a sensing circuit positioned near the output power trace to detect a characteristic of the output power trace. The sensing circuit can transmit data to the microcontroller corresponding to the characteristic of the output power trace. The microcontroller can control the LED sources based on the data transmitted by the sensing circuit.

DESCRIPTION OF THE DRAWINGS

FIG. 12 is a schematic illustration of an optoisolator for use with the power control system of FIG. 11.

FIG. 13 is a schematic illustration of a triac circuit for use with the power control system of FIG. 11.

FIG. 14 is a schematic illustration of a power switch for use with the power control system of FIG. 11.

FIG. 16 is a schematic illustration of a zero-crossing detection circuit for use with the logic control system of FIG. 2.

FIG. 17 is a schematic illustration of a current sensing circuit for use with the power control system of FIG. 11.

DETAILED DESCRIPTION

Figure 1:
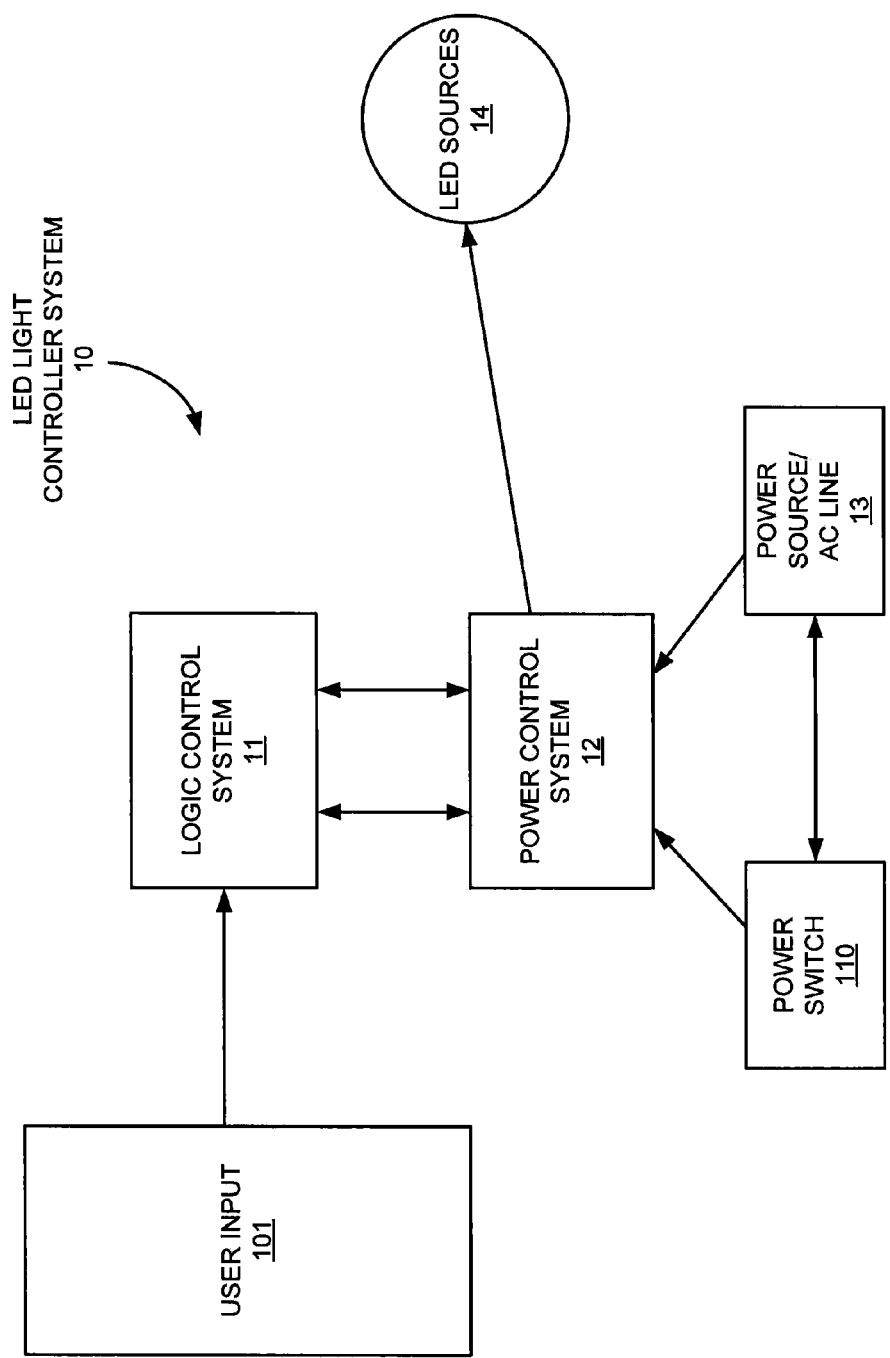
FIG. 1 is a schematic illustration of a LED light controller system according to one embodiment of the disclosure.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings, whether mechanical or electrical. Further, "connected" and "coupled" are not restricted to physical or mechanical connections or couplings.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

FIG. 1 illustrates a schematic of a light emitting diode (LED) light controller system 10 according to one embodiment of the disclosure. A standard outlet/switch box containing circuit boards as well as push buttons and a rotary switch for a user can be mounted on a wall. The box can be metal or plastic. A multitude of color shows can be represented on a faceplate on the box. The user can align the rotary switch to a specific color show representation on the faceplate. The LED light controller system can read this selection from the user and output the specific color show by controlling LEDs in pool, spa, and/or landscape lights or sources.

The controller system 10 can include a user input 101 and a power switch 110, a logic control system 11, a power control system 12, an AC power source (e.g., AC mains line) 13, and LED sources 14. In one embodiment, these components can be connected as shown by arrows in FIG. 1; however, other configurations are possible. The LED sources 14 can include LED pool, spa, and/or landscape lights, or any other LED sources capable of light output control in the form of fixed-color or multi-colored shows. The LED sources 14 can be a multitude of different color LEDs. The LED sources 14 can be 120 volt (V) lights or 12V lights including a step-down transformer. The AC line 13 can be connected to the power control system 12 through a ground fault circuit interrupter (GFCI) as the source of power to a portion of the entire LED light controller system 10, including the power control system 12, the logic control system 11, and the LED sources 14. In addition, the power switch 110 can be connected to the power control system 12 to selectively provide or remove power to the LED light controller system 10. If the LED light controller system 10 is on (e.g., the power switch 110 is enabled), specific color show information from the user input 101 can be received and processed by the logic control system 11. The logic control system 11 can then output specific voltage pulses to signal the power control system 12 to clip or truncate the AC line 13 supplied to the LED sources 14. The specific number of AC line truncations (equating to the number of output pulses) can be interpreted by decode circuitry in the LED sources 14. As a result, the single LEDs within the LED sources 14 can be turned on or off to output various colors of the color show selected by the user.

Figure 2:
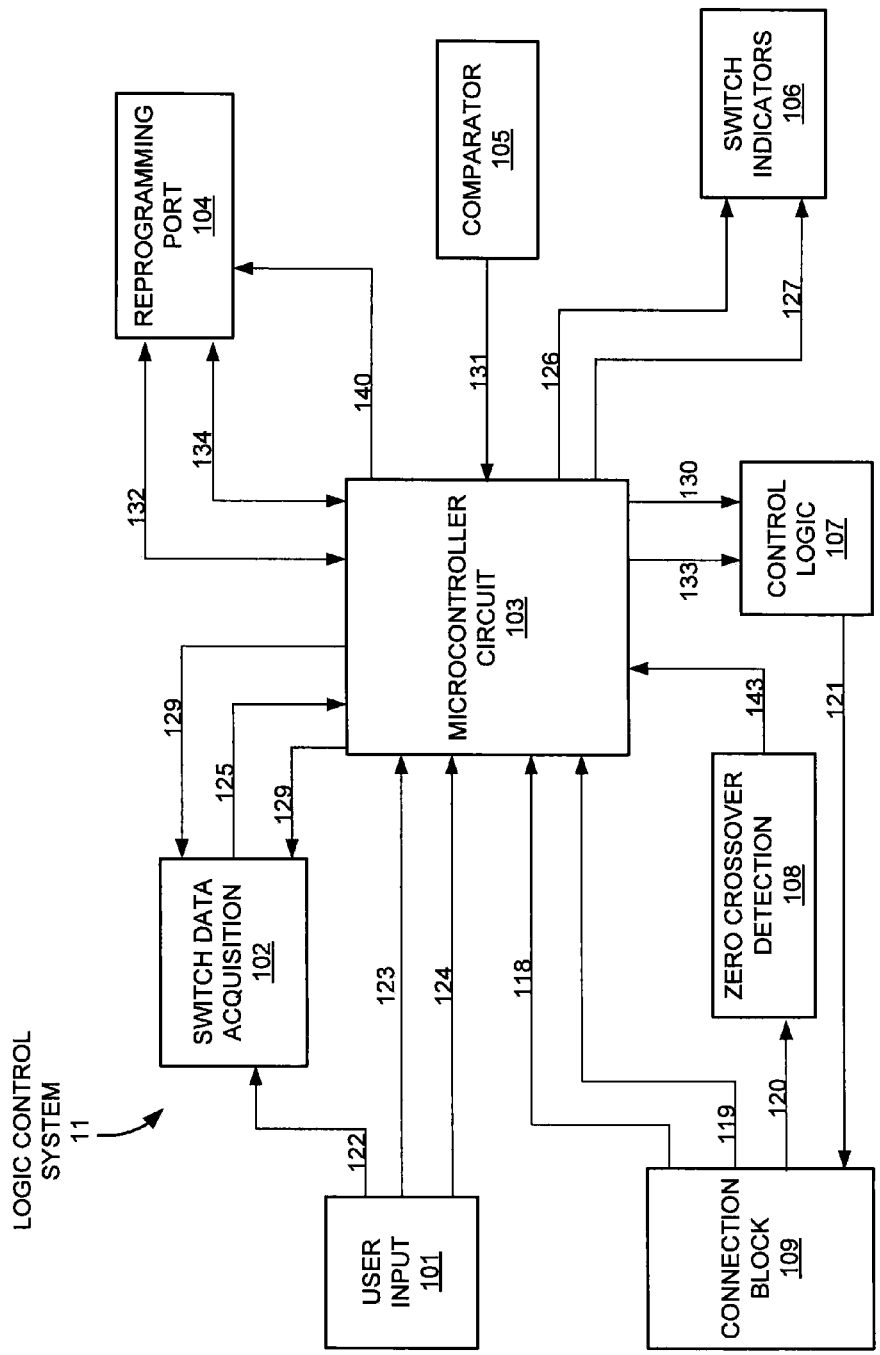
FIG. 2 is a schematic illustration of a logic control system for use with the LED light controller system of FIG. 1.

FIG. 2 illustrates the logic control system 11 of the LED light controller system 10 according to one embodiment of the disclosure. The logic control system II can include the user input 101, a switch data acquisition circuit 102, a microcontroller circuit 103, a reprogramming port 104, a comparator 105, switch indicators 106, an output control logic 107, a zero-crossover detection circuit 108, and a connection block 109. The connection block 109 can serve as the connection between the logic control system 11 and the power control system 12. The components of the logic control system 11 can be integrated circuits mounted on a circuit board that is positioned within the outlet/switch box.

Figure 3:
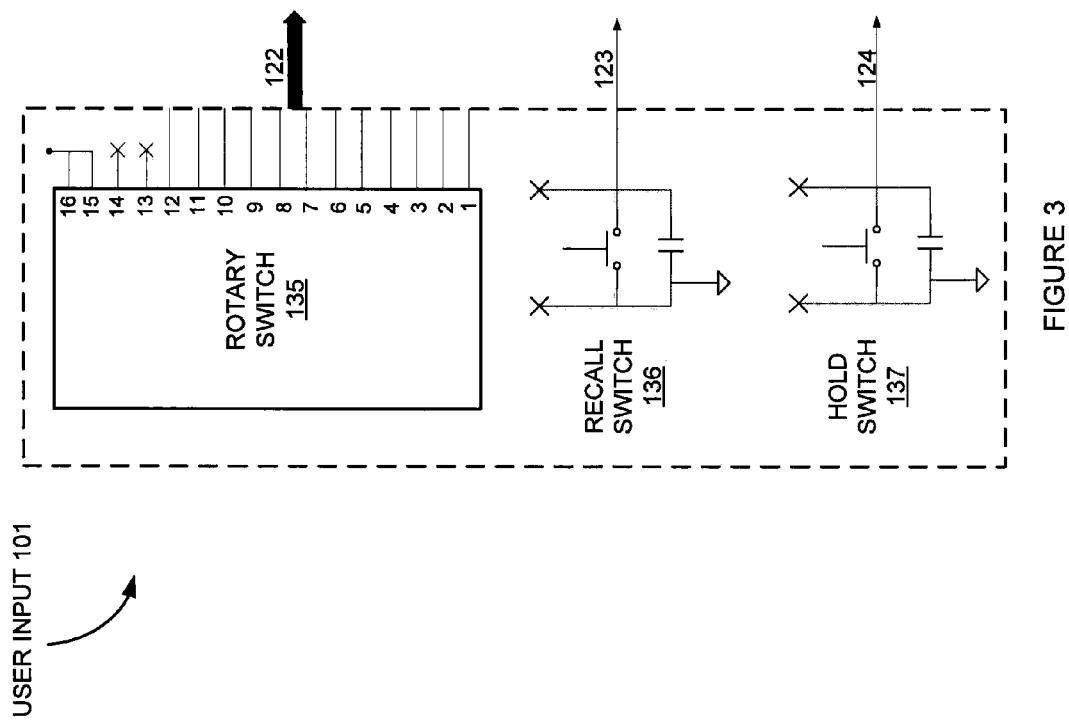
FIG. 3 is a schematic illustration of a user input for use with the logic control system of FIG. 2.
Figure 4:
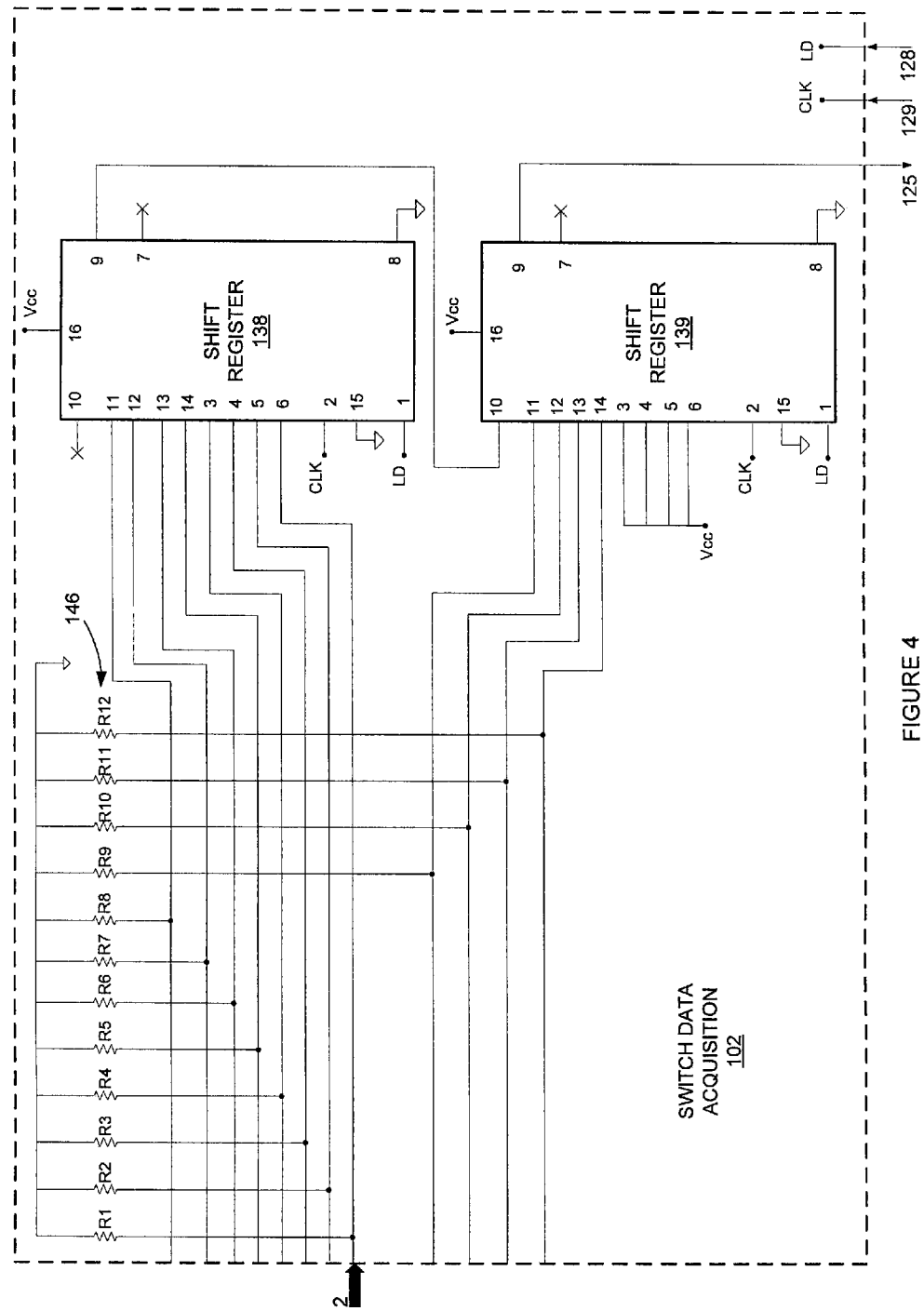
FIG. 4 is a schematic illustration of a switch data acquisition for use with the logic control system of FIG. 2.

FIG. 3 further illustrates the user input 101 from the logic control system 11 of FIG. 2. The user input 101 can include a rotary switch 135, a recall button/switch 136, and a hold button/switch 137. The rotary switch 135 can be a continuous, 12-position switch, such as those manufactured by C&K Components. The rotary switch 135 can be aligned on the front panel of the outlet/switch box. The front panel can also include a faceplate corresponding to a multitude of fixed-color or multi-colored show selections relative to the position of the rotary switch 135. From the rotary switch 135, the color show selection information can be sent to shift registers 138, 139 within the switch data acquisition circuit 102 (as shown in FIG. 4) via connection 122. In some embodiments, the rotary switch 135 can be replaced by an encoder or potentiometer. The encoder or potentiometer can perform the same function as the rotary switch 135 by transmitting a different signal for a different chosen selection without the requirement of a multitude of wires for the connection 122. The recall switch 136 and the hold switch 137 can be single-pole, single-throw (SPST) tactile switches, such as the MJTP1138B, manufactured by APEM. If the recall switch 136 is depressed, its two terminals can connect to ground and a low voltage signal can be received by the microcontroller circuit 103 (as shown in FIG. 3) via connection 123. If the hold switch 137 is depressed, the microcontroller circuit 103 can receive a signal via connection 124.

FIG. 4 illustrates the switch data acquisition circuit 102 of the logic control system 11. The switch data acquisition block 102 can contain two shift registers 138, 139 and a resistor network 146 (including resistors R1-R12) to provide decoded rotary switch position information to the microcontroller circuit 103. The two shift registers 138, 139 can be 8-bit parallel-in/serial-out shift registers, such as the 74HC165D, manufactured by NXP Semiconductors. The resistance of the resistors R1-R12 can be equal to one another and can be 10 k-ohms (these resistors as well as all resistors described herein can be 0805 size with a power rating of ⅛ watts). Specific bit patterns based on the position of the rotary switch 135 can be routed to the microcontroller circuit 103 via a connection 125. A connection 128 from the microcontroller circuit 103 can provide an interrupt to call for data ("LD") from the shift registers 138, 139. Additionally, clock information ("CLK") for the shift registers 138, 139 can come from the microcontroller circuit 103 via a connection 129.

Figure 5:
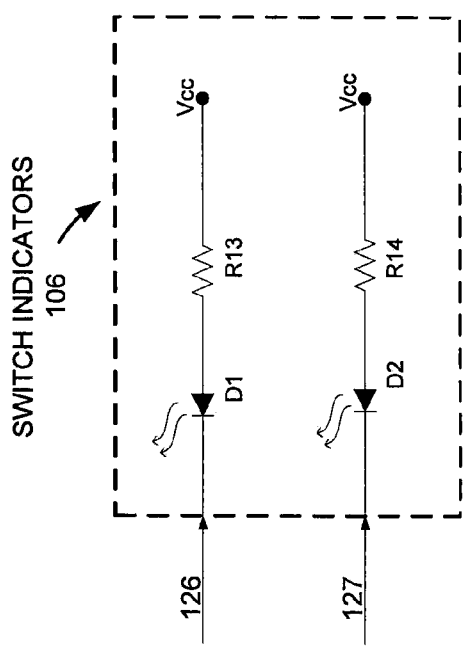
FIG. 5 is a schematic illustration of switch indicators for use with the logic control system of FIG. 2.

When either the hold or recall function is in use, the microcontroller circuit 103 can trigger a visible LED to show the active function to the user. As shown in the switch indicator block 106 in FIG. 5, visible LEDs D1 and D2 can be connected in series with resistors R13 and R14, respectively, and a supply voltage, $V_{cc}$ (e.g., 5 volts). LEDs D1 and D2 can be SOT-23 surface mount 635 nm red LEDs, such as those manufactured by LUMEX (part number SSL-LS151C-TR). Resistors R13 and R14 can each be 470 ohms in some embodiments. The resistors R13 and R14 act as current limiters, and the value of resistors R13 and R14 can vary depending on the type of diode used. A low output from the microcontroller circuit 103 (via connections 126 and 127) can allow a sufficient voltage drop to activate either diode to signal to the user which function is in use (e.g., whether the recall switch 136 or the hold switch 137 has been depressed). LEDs D1 and D2 can be mounted on the front panel of the outlet/switch box so that they can be visible to the user.

Figure 6:
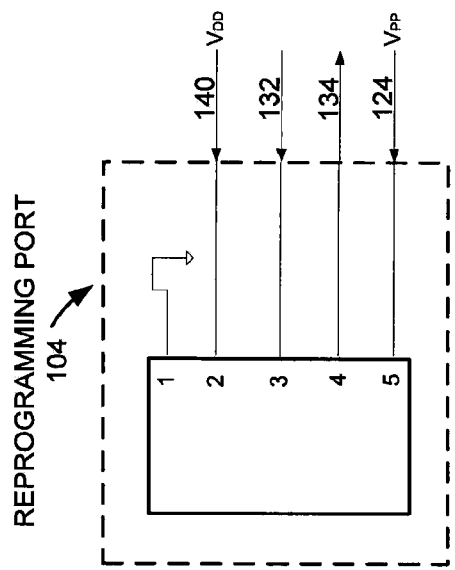
FIG. 6 is a schematic illustration of a programming port for use with the logic control system of FIG. 2.
Figure 7:
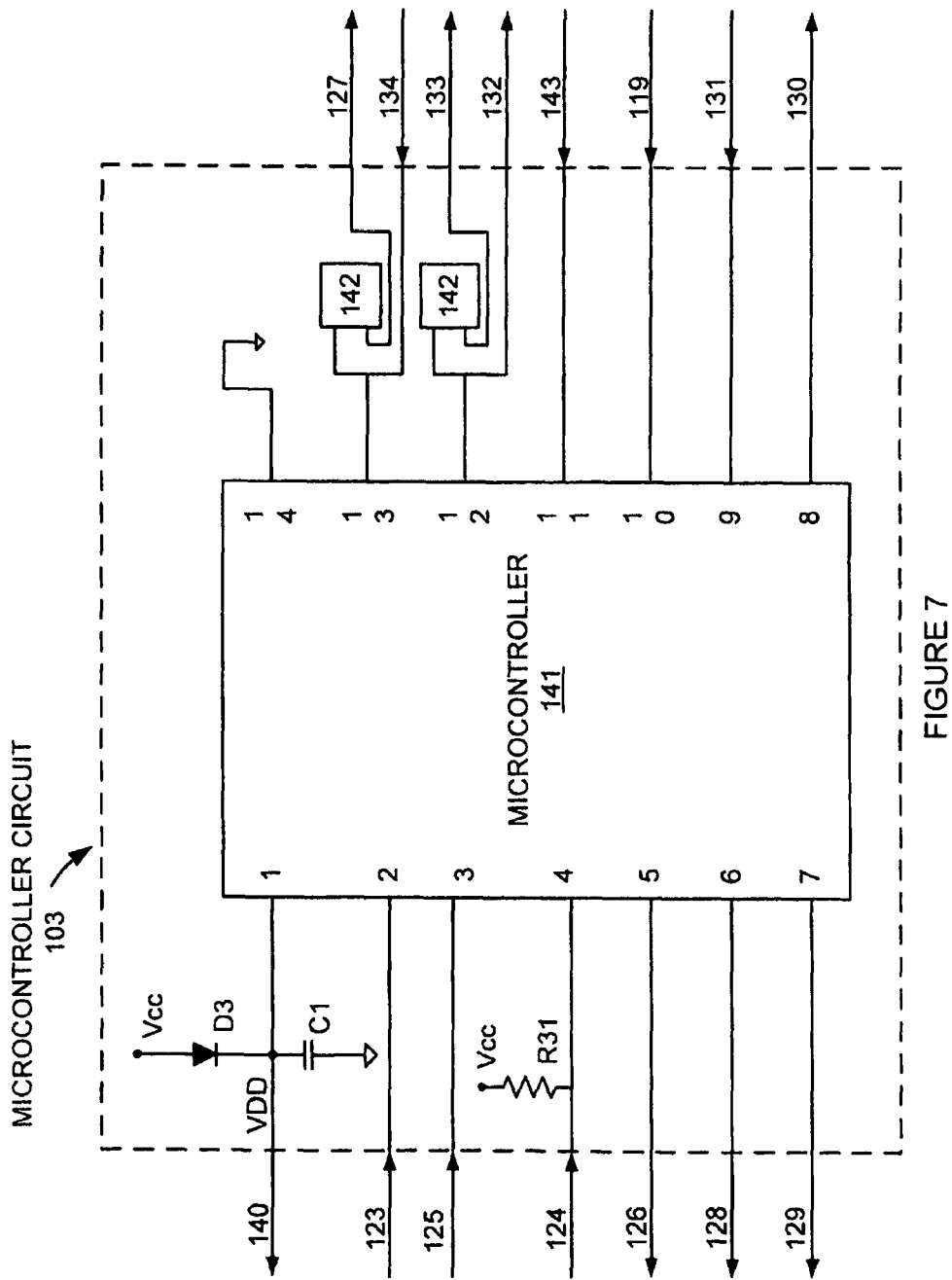
FIG. 7 is a schematic illustration of a microcontroller circuit for use with the logic control system of FIG. 2.

FIG. 6 illustrates the reprogramming port 104. The reprogramming port 104 can allow reprogramming of a microcontroller 141 (as shown in FIG. 7) within the microcontroller circuit 103 once the LED light controller system 10 is already installed in the outlet/switch box. The reprogramming port 104 can be directly connected to the microcontroller circuit 103 via connections 132 (pin 3) and 134 (pin 4) to synchronize system clocks and send data, respectively. A supply voltage to the reprogramming port 104, $V_{DD}$, can be supplied via a connection 140 (at pin 2) during normal operation of the microcontroller 141. Voltage $V_{DD}$ can also be the voltage supplied to the microcontroller 141 during normal operation. During reprogramming, however, power can be removed from the LED light controller system 10 and, therefore, $V_{DD}$ will no longer be supplied to the microcontroller circuit 103.

In this case, a higher voltage $V_{PP}$ can be supplied from the reprogramming port 104 (at pin 5) via a connection 124 to the microcontroller circuit 103 to put the microcontroller 141 into a programming mode.

FIG. 7 further illustrates the microcontroller circuit 103 included in the logic control system 11. In some embodiments, the microcontroller 141 included in the microcontroller circuit 103 can be a PIC16F684 (14-pin flash-based, 8-bit CMOS) manufactured by Microchip Technology, Inc. or similar. As used herein and in the appended claims, the term "microcontroller" is not limited to just those integrated circuits referred to in the art as microcontrollers, but broadly refers to one or more microcomputers, processors, application-specific integrated circuits, or any other suitable programmable circuit or combination of circuits. Pin 1 of the microcontroller 141 can be connected to the voltage source $V_{DD}$ to power the device during normal operation, while pin 14 can be grounded. The voltage source $V_{DD}$ can have a transient protection circuit at pin 1. The transient circuit can contain a schottky diode D3 and a capacitor C1 in series connection with supply voltage $V_{CC}$. The diode D3 can be a SMA B360A-13, manufactured by Diodes, Inc. The capacitor C1 can be a 0.1 microfarad (±10%), size 0805, X7R dielectric type capacitor rated for 25V, such as that manufactured by AVX Corporation (Part No. 08053C104KAT2A). Unless specified otherwise, all the capacitors described herein can be this type of capacitor.

Due to a large amount of inputs and outputs, pins of the microcontroller 141 can be shared using jumpers 142. As shown in FIG. 7, pins 12 and 13 of the microcontroller 141 have two separate wire connections, 132 and 133, and 134 and 127, respectively, coming into the microcontroller circuit block 103. During reprogramming of the microcontroller 141 with the reprogramming port 104, the jumpers 142 can be disconnected to allow the connection of pins 12 and 13 to the connections 132 and 134, respectively. Otherwise, the jumpers 142 can be connected to allow the connection of pins 12 and 13 to the connections 133 and 127, respectively, for normal operation.

The output from the microcontroller 141 to control the action of the LED sources 14 can be provided via pins 8 and 12 through the connections 130 and 133. The microcontroller 141 can be connected to the recall switch 136 (at pin 2) and the hold switch 137 (at pin 4) from the user input 101 via the connections 123 and 124, respectively. When the hold switch 137 is depressed, the microcontroller 141 can control the output signal (at pins 8 and 12) to hold the color that is currently showing at that time. This signal information can also be stored in the microcontroller 141 for use during the recall switch 136 operation. When the recall switch 136 is depressed, the microcontroller 141 can control the LED sources 14 to output the last color stored during the hold button 138 operation. The microcontroller 141 can include an internal pull-up resistor for the switches (at pin 2) or can use an external pull-up resistor (e.g., a resistor R31 in series with $V_{CC}$ at pin 4) for the recall switch 136 and the hold switch 137. In some embodiments, the resistor R31 can be 10 kilo-ohms.

In addition, data from the switch data acquisition circuit 102 can be input to the microcontroller 141 (at pin 3) via the connection 125. The microcontroller 141 can provide a signal (at pin 7) to the shift registers 138, 139 to call for data via the connection 129. The internal clock of the microcontroller 141 (output at pin 6) can be used by the shift registers 138, 139 in the switch data acquisition circuit 102 through the connection 128. The microcontroller 141 can also output signals to the switch indicators 106 via connections 126 and 127 from pins 5 and 13, respectively.

Figure 8:
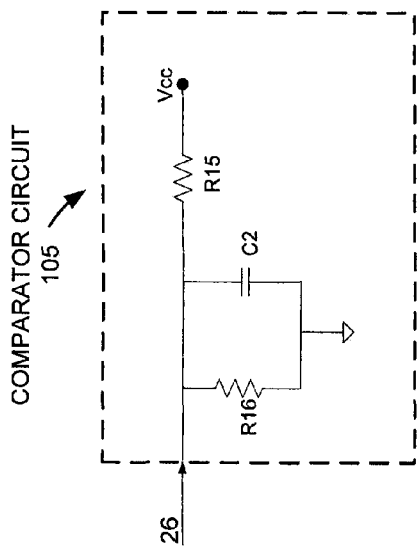
FIG. 8 is a schematic illustration of a comparator circuit for use with the logic control system of FIG. 2.

Two pins of the microcontroller 141 (e.g., pins 9 and 10) can be used for the comparator circuit 105, as shown in FIG. 8. Pin 9 can receive a reference voltage from the comparator circuit 105 via the connection 131, while pin 10 can receive a current sense voltage from the power control system 12 via the connection 119. Also, the zero-crossover detection circuit 108 (as shown in FIG. 16) can communicate the zero-crossover of the AC line 13 to the microcontroller 141 via the connection 143 at pin 11 (as further discussed with respect to the power control system 12).

A safety mechanism including output current detection can be included in some embodiments. The magnetic field of the final output power trace can be detected, converted to a respective current sense voltage, and fed back to the microcontroller 141. In response to the input voltage, the microcontroller 141 can then be capable of providing or removing output power to the LED sources 14. This can prevent too much current from reaching the LED sources 14 if any connections prior to the output trace are shorted or overloaded during startup (in addition to a fuse F1, as shown in FIG. 13). The current sense voltage from the power control system 12 can be routed to the microcontroller 141 via the connection 119.

The comparator circuit 105 (as shown in FIG. 8) can be connected to the microcontroller circuit 103 via the connection 131. The comparator circuit 105 can use a voltage divider with resisters R15 and R16, capacitor C2, and supply voltage $V_{CC}$ to produce a reference voltage; the magnitude of this reference voltage can be the threshold for the current sense voltage from the power control system 12 (i.e., a voltage trip point). In some embodiments, resistor R15 can have a resistance of 50 kilo-ohms and resistor R16 can have a resistance of 14 kilo-ohms, while capacitor C2 can have a 0.1 microfarad capacitance. Therefore, by way of example only, if the supply voltage $V_{CC}$ is about 5V, then the reference voltage at the connection 131 can be about 1V. The input to the microcontroller 141 from the current sense voltage (at the connection 119) can be compared to the reference voltage (at the connection 131). If the detected current sense voltage is above the voltage trip point, the microcontroller 141 can shut down its output, thus removing power to the LED sources 14.

Figure 9:
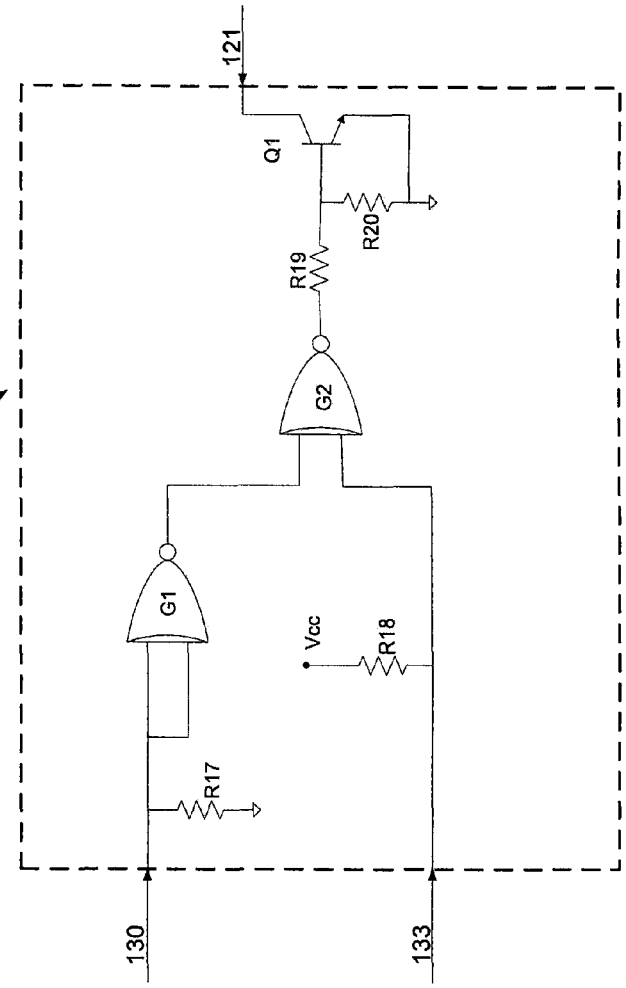
FIG. 9 is a schematic illustration of a control logic for use with the logic control system of FIG. 2.

To ensure proper microcontroller 141 operation, two pins on the microcontroller 141 (pins 8 and 12 as shown in FIG. 7) can provide output signals in the form of voltage pulses to the power control system 12. The output of these two pins can be sent to the control logic 107 (as shown in FIG. 9) via the connections 130 and 133, respectively. As shown in FIG. 9, the two outputs from the microcontroller circuit 103 can be fed through logic gates to ensure consistency before being output to the power control system 12. Logic NOR gates G1, G2 (e.g., model 74HC02/SO, available from several manufacturers) can be used, in some embodiments. In alternative embodiments, other logic gates can be used and configured for the same purpose of qualifying correct output before sending information to the power control system 12. Resistors R17, R18, and R20 in the control logic 107 can have a resistance of 10 kilo-ohms while resistor R19 can have a resistance of 4.7 kilo-ohms. Transistor Q1 can be a PMBT3904 BJT, manufactured by Phillips, among others. If the microcontroller 141 is not transmitting any signals from pins 8 and 12, the pull-down resistor R17 in connection with ground can drive the connection 130 low, while the pull-up resistor R18 in connection with $V_{CC}$ can drive the connection 133 high. The low-driven voltage at connection 130 can allow a high logic level voltage (e.g., $V_{CC}$ or 5V) emitted from G1. The combination of high logic level voltage from G1 and high-driven voltage from the connection 133 can cause a low logic level (e.g., 0V) to be emitted from G2; therefore, no signal will be sent to the power control system 12. When a user input has been detected, the microcontroller 141 can emit a high voltage (5V) pulse at (pin 8) and a simultaneous low voltage (0V) pulse (at pin 12), resulting in a high logic level (5V) at the output of G2. Each pulse output from the microcontroller 141 (qualified by the logic control 107) can allow the transmission of the high logic level emitted from G2 through a voltage divider including resistors R19 and R20. The voltage after the resistor R19 can surpass the cut-in voltage needed at the base of the transistor Q1 to operate the transistor Q1 in an active mode, allowing current to flow from the transistor's collector (at the connection 121) through its emitter to ground.

Figure 10:
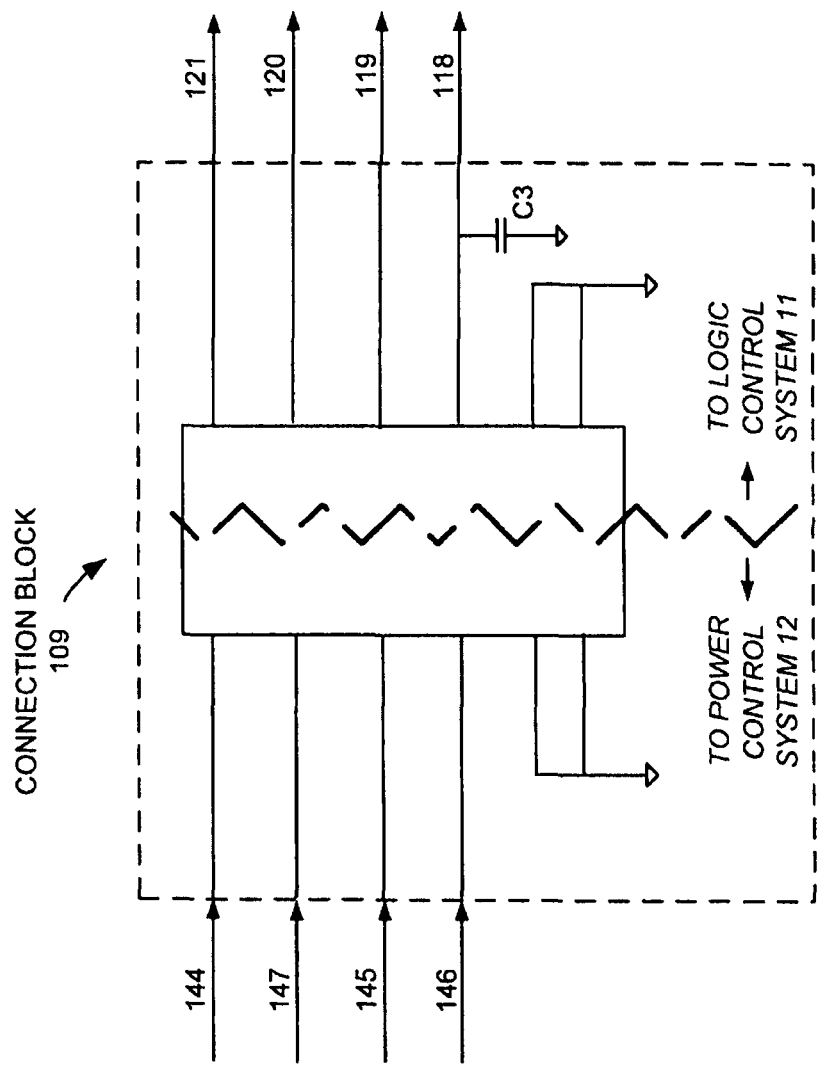
FIG. 10 is a schematic illustration of a connection block for use with the logic control system of FIG. 2.

The final signal from the control logic 107 can be provided to the power control system 12 via the connection 121 to connection block 109, as shown in FIG. 10. The connection block 109 can provide communication between the power control system 12 and the logic control system 11. The connection block 109 can be a printed circuit board (PCB) connector. As shown in FIG. 10, eight pins on the connection block 109 can transmit four different signals between the logic control system 11 and the power control system 12. The other two pins on each side can be grounded. Output signals from the control logic 107 of the logic control system 11 (at the connection 121) can be routed to the power control system 12 as the connection 144. Current sense information received by the logic control system 11 (at the connection 119) can be routed from the power control system 12 as the connection 145. The rectified, stepped-down voltage $V_{CC}$ that can power the microcontroller 141, shift registers 138, 139, rotary switch 136, and other equipment of the logic control system 10 can be routed from the connection 146 of the power control system 12 to the connection 118 of the logic control system 11. A bypass capacitor C3 can also be connected to the connection 118. The capacitor C3 can be a 100 microfarad (±10%), TAJ series, tantalum electrolytic capacitor rated for 10V, such as that manufactured by AVX Corporation (Part No. TAJC107K010R). Another rectified voltage (not stepped-down to the magnitude of $V_{CC}$) can be connected from the power control system 12 (at the connection 147) to the logic control system 11 (at the connection 120) for the zero-crossover detection block 108 (as shown in FIG. 16).

Figure 11:
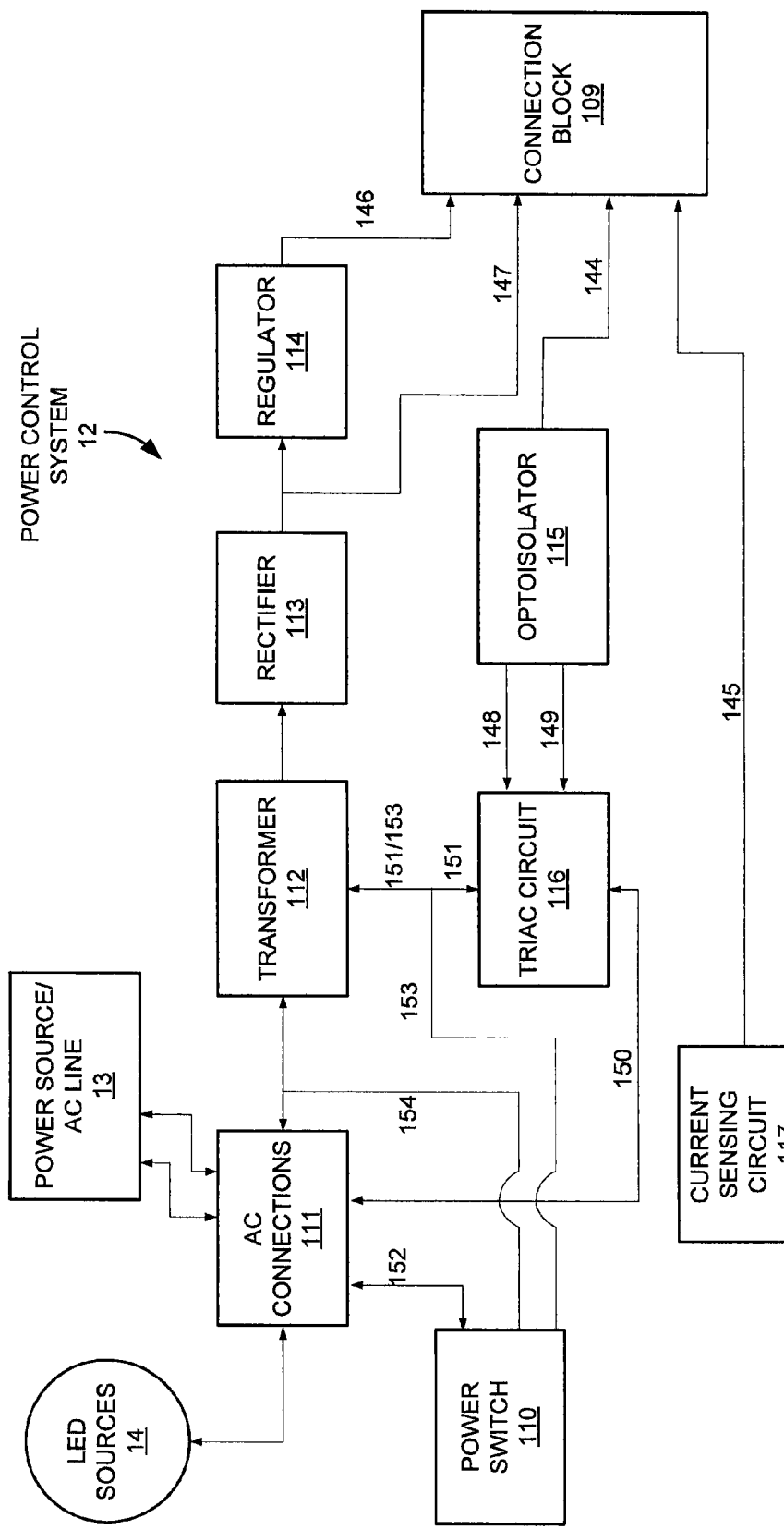
FIG. 11 is a schematic illustration of a power control system for use with the LED light controller system of FIG. 1.

FIG. 11 illustrates the power control system 12 of the LED light controller system 10 according to one embodiment of the disclosure. The power control system 12 can include the power switch 110, an AC connections block 111, a transformer 112, a rectifier 113, a voltage regulator 114, an opto-isolator 115, a triac circuit 116, current sensing circuitry 117, and the connection block 109. The components of the power control system 12 can be integrated circuits mounted on a circuit board that is positioned within the outlet/switch box.

As shown in FIG. 12, the opto-isolator 115 can provide an interface between the logic control system 11 and the triac circuit 116, in some embodiments. A photodiode D4 can be connected in series with a resistor R21 and voltage supply $V_{CC}$. In some embodiments, the resistor R21 can be 220 ohms. The active mode operation from the transistor Q1 in the control logic 107 via the connection 144 can pull current through the resistor R21, causing the photodiode D4 to turn on. Light output from the photodiode D4 can, in turn, trigger operation of the triac T1. Current through the triac T1 (via the connections 148 and 149) can then activate the triac circuit 116 (as shown in FIG. 13). The opto-isolator 115 used in some embodiments (including the photodiode D4 and the triac T1) can be model MOC3021M, manufactured by Fairchild Optoelectronics Group, among others. Similar isolation circuits to isolate the low voltage microcontroller circuit from the high mains voltage can be used in other embodiments.

FIG. 13 further illustrates the triac circuit 116 of the power control system 12. A triac T2 (or similar AC switching device) can clip or truncate the AC line 13 (from the connection 151) to the LED sources 14 (via the connection 150) in response to the signals (or lack thereof) received from the triac T1 of the opto-isolator circuit 115 (at the connection 149). As shown in FIG. 13, the connection 149 from the opto-isolator 115 can apply current to the gate of the triac T2 to trigger current through the triac T2 in either direction (through the connection 151 to the connection 150 or vice-versa), thus providing full mains voltage (e.g., 120 $V_{AC}$) to the LED sources 14. A resistor R24 (e.g., 39 ohms) and a capacitor C4 (e.g., 0.01 microfarads) can act as an RC filter to prevent large spikes in voltage in the case of a current interruption. Resistors R22 (e.g., 470 ohms) and R23 (e.g., 360 ohms) can provide current limiting and a voltage divider for the triac T2. A capacitor C5 (e.g., 0.047 microfarads) can filter out any spikes that can occur when the triac T2 is turned on. Resistors R22, R23, and R24 can have a ¼-watt power rating. The triac circuit can further include fuse F1 (e.g., a slow-blow, long-time lag, 7-amp fuse such as a 0473007.YRT1, manufactured by Littelfuse, Inc.) to prevent current overload to the LED sources 14. The use of the triac circuit 116 enables the voltage source provided to the LED sources 14 to be truncated (e.g., clipped) rather than completely deactivated (e.g., toggled on/off).

AC power to the LED light controller system 10 can be controlled via the power switch 110. FIG. 14 illustrates the power switch 110 according to one embodiment of the disclosure. The power switch 110 can be a normally-open contact switch that can provide or remove power to or from the LED light controller system 10. The power switch 110 can be a pushbutton switch (such as the PA4 series switches manufactured by Lamb Industries) connected to the power control circuit 12 by a switch connector assembly. The power switch 110 can also include an indicator light 158, as shown in FIG. 14. The power switch 110 can be connected to the transformer 112 (via the connections 154 and 153) and the AC connections block (via the connections 152 and 154) to allow power from the AC line 13 to be provided through the power control system 12 to the LED sources 14.

Figure 15:
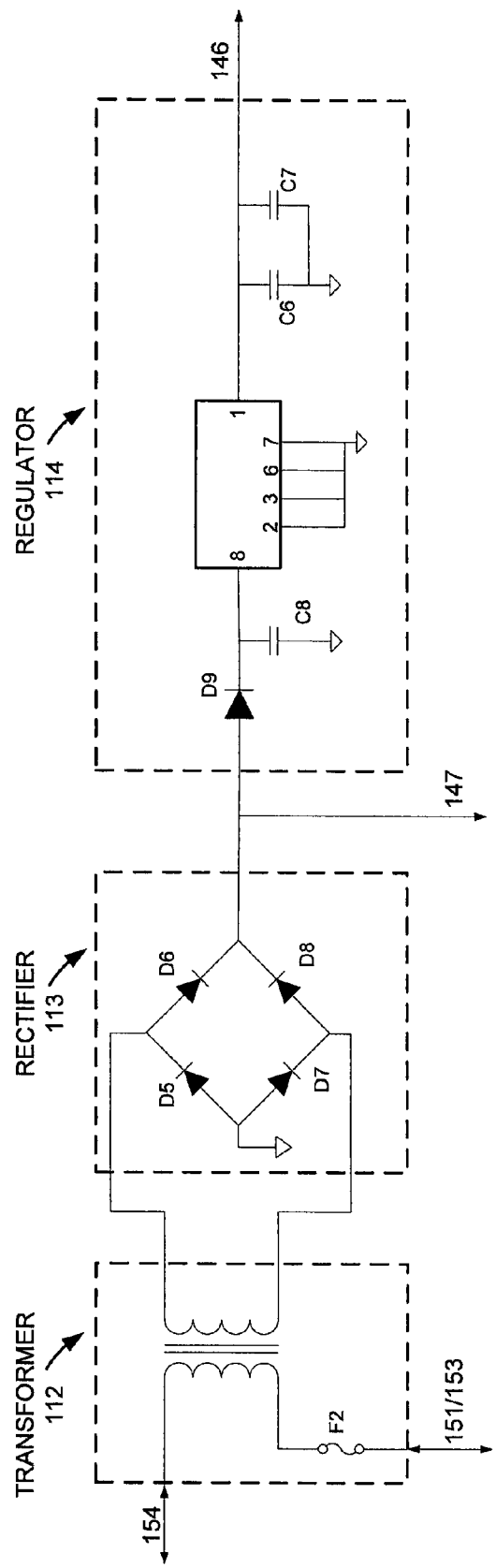
FIG. 15 is a schematic illustration of a transformer, a rectifier, and a regulator for use with the power control system of FIG. 11.

As shown in FIG. 15, the step down transformer 112 can provide low voltage from the full AC supply 13 for the bridge rectifier 113 and the voltage regulator 114. The transformer 112 can be a single $5V_{AC}$, 0.5-amp power transformer; such as model 3FS-310, manufactured by Tamura. The rectifier 113 can be a 1A, DIL bridge rectifier, such as model DF02S manufactured by Fairchild Semiconductors, among others. The voltage regulator 114 can be a 3-terminal, 0.1-amp, positive voltage regulator, such as the LM78L05A, manufactured by Fairchild Semiconductors. The power supply to the transformer 112 can come from the connection 154 (which is further connected to the AC connections block 109) and the connection 153 (which is further connected to the connection 151 of the triac circuit 116). If the power switch 110 is off, there can be no AC voltage through the connection 153 and therefore the transformer 112 can not be in operation, and thus no power can be supplied to the LED light controller system 10. The output voltage from the bridge rectifier 113 (via the connection 147) can supply a rectified DC voltage to the logic control system 11. From the connection 147 through the connection block 109 to the connection 120, the rectified DC voltage can be supplied to the zero-crossover detection circuit 108. The connection 153/151 can further lead to the triac circuit 116 and can include a fuse F2 (e.g., a fast-acting, short-time lag, 3-amp fuse such as a 6125FA, manufactured by Cooper/Bussmann) to prevent current overload.

Also included before and after the voltage regulator 114 can be transient and reverse-voltage protection circuitry, such as a diode D9 and capacitors C6-C8. The diode D9 can be a SMA B360A-13, manufactured by Diodes, Inc. In some embodiments, the capacitors C6, C7, and C8 can have a capacitance of 0.1 microfarads, 0.01 microfarads, and 0.33 microfarads, respectively. The output from the voltage regulator 114 can supply the stepped-down, rectified voltage $V_{CC}$ to components of both the power control system 12 and the logic control system 11. The voltage $V_{CC}$ can be supplied to the logic control system 11 via the connection 146 through the connection block 109 to the connection 118.

FIG. 16 illustrates the zero crossover detection circuit 108. The zero crossover detection circuit 108 can include resistors R25-R27 and a transistor Q2. Resistors R25, R26, and R27 can have resistances of 4.7 kilo-ohms, 1.0 kilo-ohms, and 10 kilo-ohms, respectively. The transistor Q2 can be a PMBT3904 BJT, manufactured by Phillips, among others. The rectified DC voltage supplied to the zero crossover detection circuit 108 (via the connection 120) of the logic control system 11 can allow the microcontroller 141 to synchronize with the AC line 13. This voltage to the transistor Q2 (via the connection 120 at the base of the transistor Q2) drops to zero volts when the AC line amplitude crosses zero volts. The zero-volt base input can turn on the transistor Q2 in an active mode which in turn can pull the respective input to the microcontroller circuit 103 low (via the connection 143 from the collector of the transistor Q2). The low input signal representing zero crossover of the AC line 13 can then synchronize the microcontroller 141 to the AC line 13. This can provide the proper timing for the microcontroller 141 to switch the triac T2, thus reducing the chances for spiking.

Referring back to the power control system 12, the final clipped AC signal from the triac T2 (at the connection 150) can be routed to the AC connections block 111, which can power the LED sources 14, producing the desired light output. The current sensing circuit 117 can be placed on one side of the power control system circuit board opposite the output power trace at the connection 150 (i.e., above or below the trace) and can include, as shown in FIG. 17, a current sensing device 155 and an amplifying circuit 156. The current sensing device 155 can be an integrated magnetic field sensor, such as the CSA-1V, in a SOIC-8 package, manufactured by GMW. A ferrite bead (not shown) can be placed on the trace near the current sensing device 155, helping amplify the magnetic field. The current sensing device 155 can convert the magnetic energy from the output trace (at the connection 150) to a voltage proportional to the current through the output trace.

As shown in FIG. 17, the voltage signal from the current sensing device 155 (at the connection 157) can be amplified and filtered via the amplifying circuit 156. The amplifying circuit 156 can include resistors R28-R30, capacitor C10, and an op amp A1. The op amp A1 can be a single CMOS op amp with low-voltage, low-power, and rail-to-rail output swing capabilities in an SOT-23 package, such as the TLV341 model (TLV341IDBVR), manufactured by Texas Instruments. In some embodiments, the resistor R28 can be 18 kilo-ohms, the resistor R29 can be 10 kilo-ohms, and the resistor R30 can be 34 kilo-ohms. Capacitors C9 (e.g., 1 microfarad), C10 (e.g., 0.1 microfarads), and C11 (e.g., 0.1 microfarads) can provide transient protection for the current sensing circuit 117. The current sense voltage output by the amplifying circuit 156 can be routed to the connection block 109 (via the connection 145). The current sense voltage from the connection block 109 (at the connection 119 in the logic control system 11) can be routed to the microcontroller circuit 103. As previously discussed, if detected current sense voltage is above the voltage trip point, the microcontroller 141 can shut down its output, thus removing power from the LED sources 14. The AC connections block 111 (as shown in FIG. 11) can accommodate voltage connections between the AC line 13, the power control system 12, and the LED sources 14.

Figure 18:
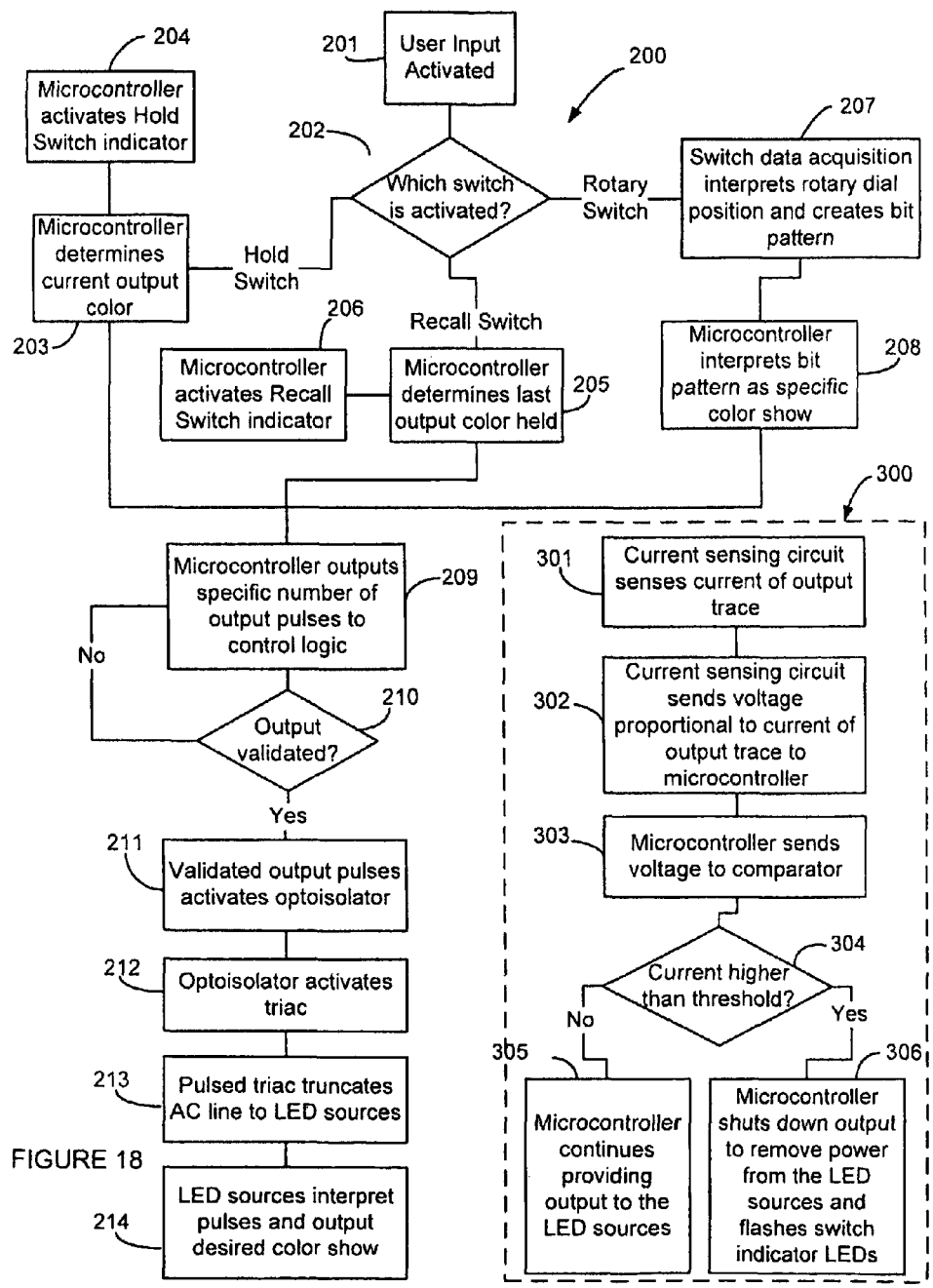
FIG. 18 is a flow chart illustrating operation of the LED light controller system of FIG. 1.

FIG. 18 illustrates a flow chart 200 describing portions of the operation of the LED light controller system 10, according to some embodiments. First, the user input 101 is activated (task 201). Activating the user input can include pressing of the hold switch 137, pressing of the recall switch 136, or rotating the rotary switch 135 to a selected color show. Depending on which switch is activated, different paths of operation can be taken (task 202). If the hold switch 137 is depressed, the microcontroller 141 determines the current output color of the LED sources 14 (task 203) and activates the hold switch indicator 106 (task 204). If the recall switch 136 is depressed, the microcontroller 141 determines the output color held during the last hold switch operation (task 205) and activates the recall switch indicator 106 (task 206). If the rotary switch 135 is adjusted, the switch data acquisition 102 interprets the rotary switch position and creates a bit pattern specific to that position (task 207). The microcontroller 141 then interprets the bit pattern created by the switch data acquisition 102 as a specific color show (task 208). After task 203, task 205, or task 208, the microcontroller 141 outputs a specific number of output voltage pulses to the control logic 107 (task 209). The control logic 107 validates the microcontroller 141 operation (task 210). Task 210 will continue to loop back to task 209 until the control logic 107 validates proper output. Once correctly validated, the control logic 107 outputs the output voltage pulses to activate the opto-isolator 115 (task 211). The opto-isolator 115 activates the triac circuit 116 with the pulsed voltage output (task 212). The pulsed voltage output turns on the triac circuit 116 in pulses and truncates the AC line 13 to the LED sources 14 (task 213). The LED sources 14 interpret the specific number of pulses and output a respective color show (task 214).

Also shown in FIG. 18 is a sub-flow chart 300 of the current sensing circuit 117, acting as an interrupt to the microcontroller 141. The current sensing circuit 117 senses the current of the output trace at the connection 150 (task 301). The current sensing circuit 117 transmits the current sense voltage proportional to the current of the output trace to the microcontroller 141 (task 302). The microcontroller 141 sends the current sense voltage to the comparator 105 (task 303). The comparator 105 compares the current sense voltage to the threshold voltage (task 304). If the current sense voltage is below the threshold voltage, the microcontroller 141 will continue to provide output the LED sources 14 (task 305). If the current sense voltage is greater than the threshold voltage, the microcontroller 141 will shut down its output to remove power from the LED sources 14 (task 306).

Figure 19:
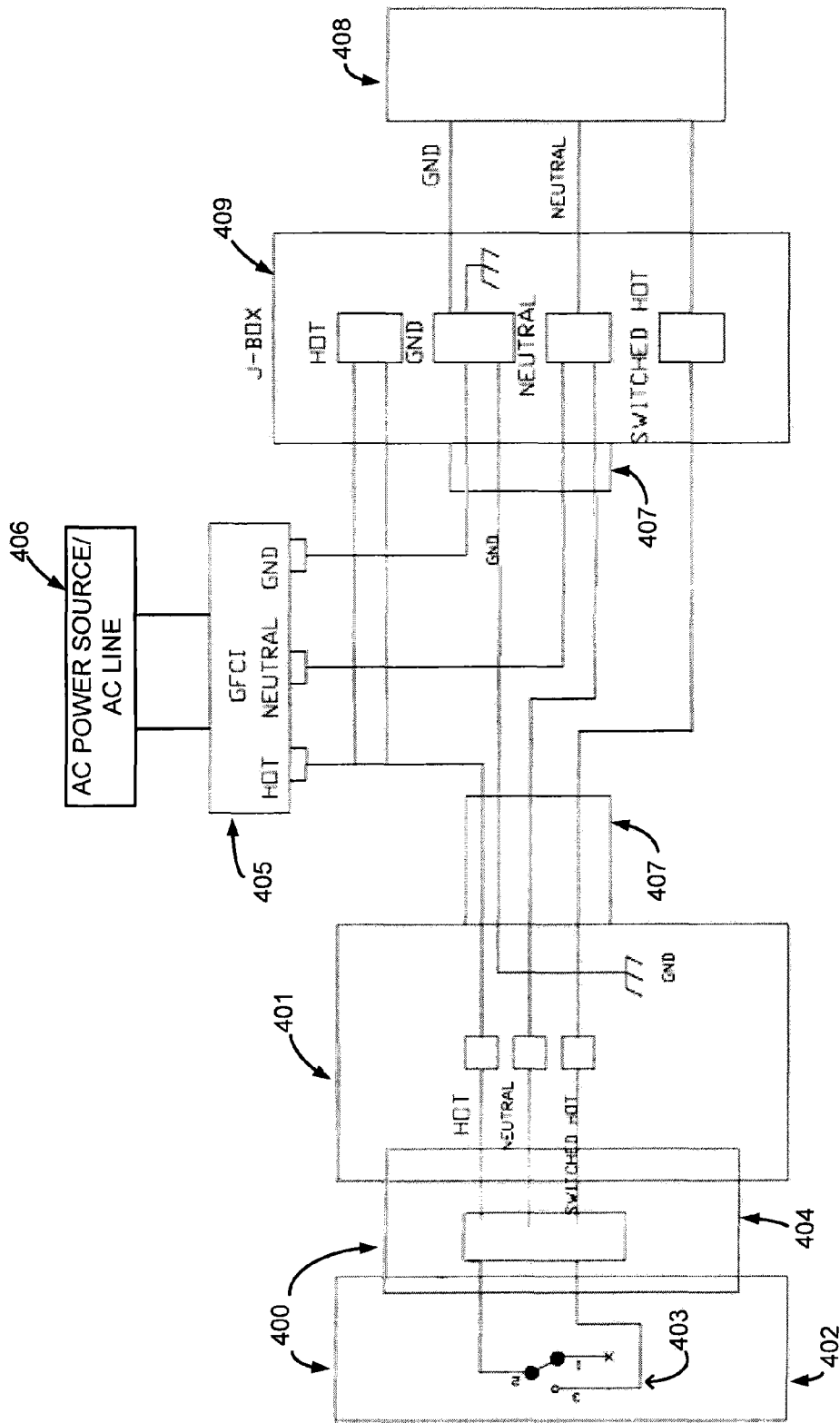
FIG. 19 is a wiring diagram of a LED light controller system according to another embodiment of the disclosure.

FIG. 19 illustrates a wiring diagram for an LED light controller system 400 according to another embodiment of the disclosure. The LED light controller system 400 can be housed within a metal gang box 401. A front panel 402 on the gang box 401 can include a power switch 403 to control power to the LED light controller system 400. The power switch 403 can be connected to the power control system 404. The power control system 404 can receive power from a ground fault circuit interrupter (GFCI) 405. Power to the GFCI 405 can come from an AC power source (AC line) 406. Wire connections can be protected by a rigid or PVC conduit 407. The power control system 404 can be connected to a plurality of LED sources 408 via a junction box 409. The plurality of LED sources 408 can include landscape, pool, and/or spa lights. Once the switch 403 has been depressed, a "hot" voltage wire from the GFCI 405 can be in connection with the "switched hot" voltage wire, thus providing voltage to the plurality of LED sources 408. The power control system 404 can clip the AC voltage on the "switched hot" voltage wire to provide pulses to the plurality of LED sources 408. Decode circuitry within the plurality of LED sources 408 can process the number of pulses received and output a corresponding light show. The number of pulses provided can determined by a logic control system (not shown) from a user input (not shown) on the front panel 402.

It will be appreciated by those skilled in the art that while the disclosure has been described above in connection with particular embodiments and examples, the disclosure is not necessarily so limited, and that numerous other embodiments, examples, uses, modifications and departures from the embodiments, examples and uses are intended to be encompassed by the claims attached hereto. Various features and advantages of the disclosure are set forth in the following claims.

The invention claimed is:

1. A system for controlling a plurality of light emitting diode sources with decode circuitry to generate a plurality of user-selected color shows, a voltage being provided to the system by an alternating current source, the system comprising:
a user interface that receives data regarding the user-selected color show;
a microcontroller that receives data from the user interface;
a triac in communication with the microcontroller, the triac providing communication between the alternating current source and the plurality of light emitting diode sources, the triac receiving signals from the microcontroller based on the data received from the user interface, the triac clipping the voltage from the alternating current source to the plurality of light emitting diode sources in order to provide at least one voltage pulse to the plurality of light emitting diode sources, the at least one voltage pulse capable of being interpreted by the decode circuitry of the plurality of light emitting diode sources to indicate that a first user-selected color show of the plurality of user-selected color shows is desired, the decode circuitry controlling the plurality of light emitting diode sources to produce light output based on the interpretation in order to generate the first user-selected color show.

2. The system of claim 1 wherein the user interface includes at least one of a rotary switch, an encoder, and a potentiometer.

3. The system of claim 1 wherein the user interface includes a recall button.

4. The system of claim 1 wherein the user interface includes a hold button.

5. The system of claim 1 further comprising a current sensing circuit in communication with the microcontroller, the current sensing circuit providing a voltage signal to the microcontroller proportional to current from the alternating current source to the plurality of light emitting diodes.

6. A system for selecting one of a plurality of color shows generated by at least one of light emitting diode landscape, pool, and spa lights with decode circuitry, the system comprising:
a faceplate indicating the plurality of color shows available to select from, the faceplate including a selector positioned to select one of the plurality of color shows;
a microcontroller in communication with the selector; and
a triac circuit in communication with the microcontroller, the microcontroller controlling the at least one of light emitting diode landscape, pool, and spa lights using the triac circuit in response to the position of the selector by outputting a specific number of voltage pulses capable of being interpreted by the decode circuitry of the at least one of light emitting diode landscape, pool, and spa lights as one of the plurality of color shows.

7. The system of claim 6 wherein the faceplate includes a recall button in communication with the microcontroller and the microcontroller controls the at least one of light emitting diode landscape, pool, and spa lights using the triac circuit in response to the status of the recall button.

8. The system of claim 6 wherein the faceplate includes a hold button in communication with the microcontroller and the microcontroller controls the at least one of light emitting diode landscape, pool, and spa lights using the triac circuit in response to the status of the hold button.

9. The system of claim 6 and further comprising a current sensing circuit in communication with the microcontroller and the microcontroller controls the at least one of light emitting diode landscape, pool, and spa lights using the triac circuit in response to the current sensing circuit.

10. The system of claim 6 and further comprising a gang box including a front panel, wherein the faceplate is coupled to the front panel and the microcontroller is housed within the gang box.

* * * * *